US011167452B2

(12) United States Patent  
Kajiyama (10) Patent No.: US 11,167,452 B2
(45) Date of Patent: Nov. 9, 2021

(54) METHOD OF MANUFACTURING FIBER-REINFORCED COMPOSITE MATERIAL

(71) Applicant: SUBARU CORPORATION, Tokyo (JP)

(72) Inventor: Tsutomu Kajiyama, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 402 days.

(21) Appl. No.: 15/873,623

(22) Filed: Jan. 17, 2018

(65) Prior Publication Data

US 2018/0243947 A1    Aug. 30, 2018

(30) Foreign Application Priority Data

Feb. 28, 2017    (JP) .............................. JP2017-037323

(51) Int. Cl.

| | |
|---|---|
| *B29C 31/00* | (2006.01) |
| *B29C 39/24* | (2006.01) |
| *B29C 70/02* | (2006.01) |
| *B29C 31/08* | (2006.01) |
| *B29C 37/00* | (2006.01) |
| *B29C 35/02* | (2006.01) |
| *B29C 70/48* | (2006.01) |

(52) U.S. Cl.
CPC ............ *B29C 31/008* (2013.01); *B29C 35/02* (2013.01); *B29C 37/006* (2013.01); *B29C 37/0064* (2013.01); *B29C 39/24* (2013.01); *B29C 70/48* (2013.01); *B29C 31/08* (2013.01); *B29C 70/021* (2013.01); *B29C 2791/008* (2013.01)

(58) Field of Classification Search
CPC ... B29C 31/008; B29C 70/48; B29C 37/0064; B29C 37/006; B29C 39/24; B29C 35/02; B29C 70/021; B29C 2791/008; B29C 31/08; B29C 70/54
See application file for complete search history.

(56) References Cited

U.S. PATENT DOCUMENTS

| | | |
|---|---|---|
| 2012/0073596 A1 | 3/2012 | Holstenyns et al. |
| 2014/0070452 A1 | 3/2014 | Akiymama et al. |

FOREIGN PATENT DOCUMENTS

| | | |
|---|---|---|
| CN | 103118810 B | 7/2015 |
| JP | 58-82719 A | 5/1983 |
| JP | 61-143122 A | 6/1986 |

(Continued)

OTHER PUBLICATIONS

Japanese Office Action dated Nov. 6, 2018 during the prosecution of JP Patent Application No. 2017-037323.

(Continued)

*Primary Examiner* — Robert J Grun
(74) *Attorney, Agent, or Firm* — Troutman Pepper Hamilton Sanders LLP (57) ABSTRACT

A method of manufacturing a fiber-reinforced composite material which is molded by impregnating a fiber-reinforced sheet with a resin and curing the resin includes: placing the fiber-reinforced sheet in a cavity of a mold; and molding the fiber-reinforced composite material, the molding including injecting the resin into the cavity of the mold, impregnating the fiber-reinforced sheet with the resin, and curing the resin. In the molding, after fine air bubbles contained in the resin are placed at a predetermined position of the cavity, the resin is cured.

2 Claims, 5 Drawing Sheets

(56) References Cited

FOREIGN PATENT DOCUMENTS

| | | |
|---|---|---|
| JP | 2008-179130 A | 8/2008 |
| JP | 2014-129448 A | 7/2014 |
| WO | 2012/157327 A1 | 11/2012 |

OTHER PUBLICATIONS

First Office Action issued in corresponding Chinese Patent Application No. 201711162738.8 dated Mar. 9, 2021, with machine translation.

METHOD OF MANUFACTURING FIBER-REINFORCED COMPOSITE MATERIAL

CROSS-REFERENCE TO RELATED APPLICATIONS

The present application claims priority from Japanese Patent Application No. 2017-037323 filed on Feb. 28, 2017, the entire contents of which are hereby incorporated by reference.

BACKGROUND

1. Technical Field

The present invention relates to a method of manufacturing a fiber-reinforced composite material, and particularly, a method of manufacturing a fiber-reinforced composite material, that when a fiber-reinforced sheet is impregnated with a resin and the resin is cured in a mold, favorably controls the positions and sizes of the air bubbles contained in the resin.

2. Related Art

In recent years, a resin transfer molding (RTM) method or a reaction injection molding (RIM) method is used as a manufacturing method for a fiber-reinforced composite material. With these methods, a multilayer structure, in which multiple fiber-reinforced sheets are stacked, is set in a mold, and after the mold is clamped, uncured resin is injected to impregnate the multilayer structure with the resin, and the uncured resin is cured. With these methods, a molded article having a relatively complicated shape can be manufactured in order to form a multilayer structure including a dry base material which is not impregnated with a resin.

However, a fiber-reinforced sheet before impregnated with a resin is not efficiently handled because stacked fiber-reinforced sheets may be disassembled during transport. For this reason, normally, preliminary shaping step is set before essential shaping to impregnate with a resin is made (Japanese Unexamined Patent Application Publication No. 2008-179130).

In the preliminary shaping step, one fiber-reinforced sheet is set in a mold for preliminary shaping, fixing materials in powder form are scattered on the surface, and the subsequent fiber-reinforced sheet is stacked on the previous sheet. These steps are repeated sequentially, and a multilayer structure of fiber-reinforced sheets is formed, and subsequently, the mold is clamped by the preliminary shaping. Thus, the fiber-reinforced sheets are fixed to each other, and a preform structure is formed, which has undergone preliminary shaping to have a shape suitable for the subsequent essential shaping. In the essential shaping step, the preform structure is set in the mold for the essential shaping, thereby facilitating positioning and preventing positional displacement at the time of essential shaping.

Meanwhile, when a fiber-reinforced sheet is molded with a resin, several methods of removing air bubbles contained in the resin have been proposed. Japanese Unexamined Patent Application Publication (JP-A) No. 58-82719 describes a method in which resin is impregnated while removing air bubbles in the resin by applying ultrasonic vibration to the resin at the time of molding. Japanese Unexamined Patent Application Publication No. 2014-129448 describes a method of manufacturing a thermoplastic resin foam having fine air bubbles by irradiating resin compositions with ultrasonic waves. Japanese Unexamined Patent Application Publication (JP-A) No. 61-143122 describes a method of moving and removing air bubbles by providing a temperature difference between a central area and a peripheral area at the time of molding.

However, as described above, the method of manufacturing a fiber-reinforced composite material, which performs preliminary shaping step before the essential shaping step, has a problem in that the manufacturing process is complicated, and the number of molds used for the manufacturing increases, and thus the manufacturing cost increases.

To cope with the aforementioned problem, the following approach may be taken: a fiber-reinforced sheet is set in a mold without undergoing the preliminary shaping, the fiber-reinforced sheet is impregnated with a resin by injecting the resin into the mold, and subsequently, the injected resin is cured in the mold.

However, air bubbles are somewhat mixed in the resin to be injected into the mold, and when the molding is performed without coping with the mixed air bubbles, void occurs in space in which the air bubbles are contained. Thus, a problem may arise, such as reduction of the strength of the fiber-reinforced composite material in the space where void occurs, or deterioration of appearance quality.

Also, although occurrence of void is prevented by performing vacuum which sucks the air bubbles contained in the resin by a pump, air bubbles may remain in the resin because a complete vacuum state is not possible.

Furthermore, although the aforementioned JP-A No. 58-82719 and JP-A No. 61-143122 each describe a method of removing air bubbles at the time of resin molding, the sizes and positions of air bubbles contained in the resin are not actively controlled, and the positions of air bubbles contained in the resin are not precisely controlled.

SUMMARY OF THE INVENTION

The present invention has been made in view of the above-mentioned circumstances, and it is desirable to provide a method of manufacturing a fiber-reinforced composite material capable of reducing deterioration of the quality of the fiber-reinforced composite material by precisely controlling the sizes and positions of air bubbles contained in the resin at the time of molding.

A first aspect of the present invention provides a method of manufacturing a fiber-reinforced composite material which is molded by impregnating a fiber-reinforced sheet with a resin and curing the resin. The method includes: placing the fiber-reinforced sheet in a cavity of a mold; and molding the fiber-reinforced composite material, the molding including injecting the resin into the cavity of the mold, impregnating the fiber-reinforced sheet with the resin, and curing the resin. In the molding, after fine air bubbles contained in the resin are placed at a predetermined position of the cavity, the resin is cured.

BRIEF DESCRIPTION OF THE DRAWINGS

FIGS. 1A to 1C are views illustrating a fiber-reinforced composite material manufactured by a method of manufacturing a fiber-reinforced composite material according to an example of the present invention.

FIGS. 3A and 3B are views illustrating the method of manufacturing a fiber-reinforced composite material according to the example of the present invention.

FIGS. 4A to 4C are views illustrating the method of manufacturing a fiber-reinforced composite material according to the example of the present invention, FIGS. 5A and 5B are views illustrating a method of manufacturing a fiber-reinforced composite material according to another example of the present invention.

DETAILED DESCRIPTION

Hereinafter, a method of manufacturing a fiber-reinforced composite material 10 according to an example of the present invention will be described in detail with reference to the drawings. In the following description, for the same member, the same number is used in principle, and repetitious description is omitted.

Figure 1A:
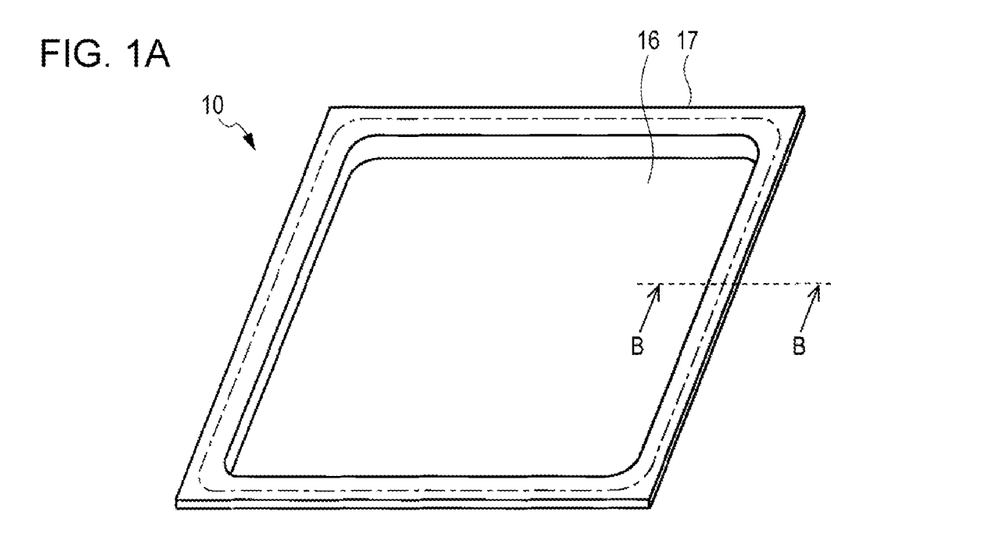
FIG. 1A is a perspective view.
Figure 1B:
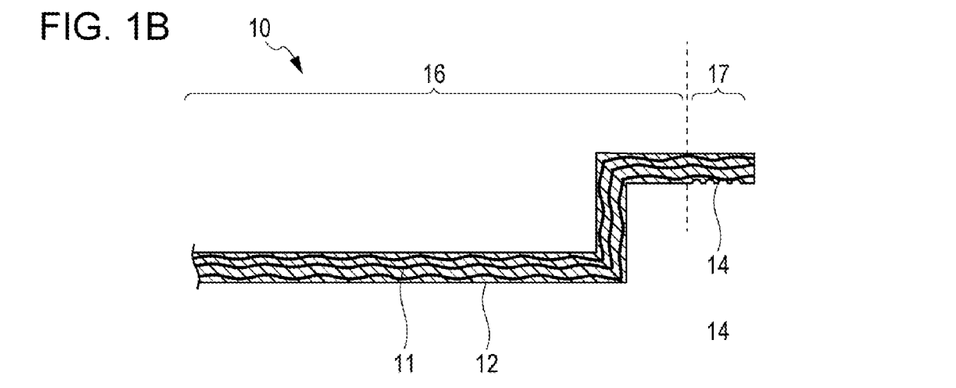
FIGS. 1B and 1C are each a sectional view.
Figure 1C:
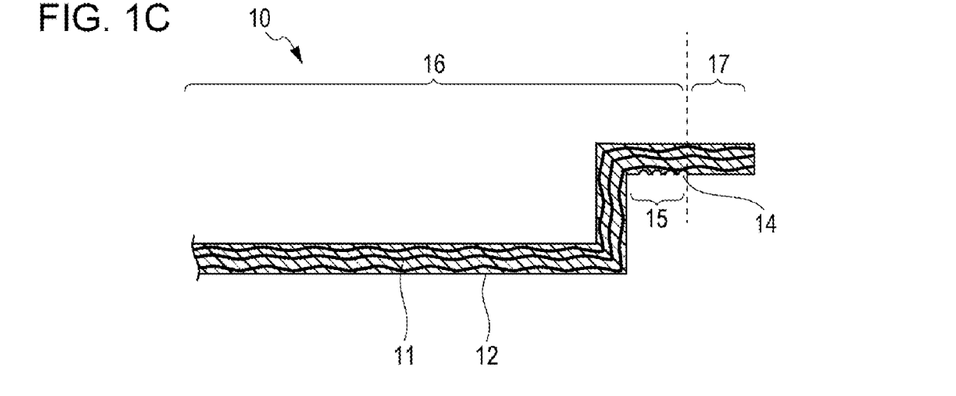

Referring to FIGS. 1A to 1C, the fiber-reinforced composite material 10 manufactured by the method of manufacturing the fiber-reinforced composite material 10 according to this example. FIG. 1A is an overall perspective view of the fiber-reinforced composite material 10, and FIGS. 1B and 1C are sectional views taken along line B-B. FIG. 1B illustrates a case where an asperity surface 14 is formed in a discarded region 17, and FIG. 1C illustrates a case where the asperity surface 14 is formed in a bonding area 15 of a product region 16.

The fiber-reinforced composite material 10 illustrated in FIG. 1A is, for instance, a carbon fiber reinforced plastics (CFRP), and has an approximately tray shape as an example. Here, FIG. 1A illustrates the fiber-reinforced composite material 10 in which the later-described molding step is completed, and which is immediately after taken out from a mold. After the molding step is completed, the fiber-reinforced composite material 10 is cut off at the position indicated by a dashed dotted line specified in the peripheral area. The part of the fiber-reinforced composite material 10 inwardly of the dashed dotted line is the product region 16 that provides a product, and the rest part of the fiber-reinforced composite material 10 outwardly of the dashed dotted line is the discarded region 17 that is to be discarded. The fiber-reinforced composite material 10 having such a configuration is used as a component of a vehicle such as a passenger car.

Referring to FIG. 1B, the fiber-reinforced composite material 10 includes a fiber-reinforced sheet 11, and a resin 12 that is impregnated into the fiber-reinforced sheet 11 and is cured.

For instance, carbon fiber, glass fiber, or aramid fiber may be used as the reinforced fiber of which the fiber-reinforced sheet 11 is composed. Also, a fabric material such as woven and knit, a unidirectional material (UD material) may be adopted as the form of the fiber-reinforced sheet 11. The fiber-reinforced sheet 11 includes a multilayer structure in which multiple sheet-like reinforced fibers are stacked.

A thermosetting resin, such as an epoxy resin, or a thermoplastic resin, such as polyamide (PA) and polypropylene (PP) may be adopted as the resin 12. The resin 12 is cured with impregnated into the fiber-reinforced sheet 11.

According to the method of manufacturing a fiber-reinforced composite material of this example, as described later, in the molding step, the positions and sizes of air bubbles 29 mixed in the resin 12 in a liquid state or a state of low viscosity are appropriately controlled, and the resin 12 is cured. Consequently, although air bubble trails remain in an area of the resin 12, into which air bubbles are mixed, air bubble trails are not formed in an area serving as a design surface of the fiber-reinforced composite material 10 manufactured, or an area to which great external force is applied when the fiber-reinforced composite material 10 is incorporated into a vehicle. Thus, it is possible to prevent deterioration of appearance quality and reduction of the mechanical strength due to formation of air bubble trails in the fiber-reinforced composite material 10.

As illustrated in FIG. 1B, the asperity surface 14 can be formed on the underside of the discarded region 17 included in the peripheral area of the fiber-reinforced composite material 10, for instance. The asperity surface 14 is formed by moving the air bubbles mixed in the resin 12 at the time of molding to a predetermined position. In this manner, the asperity surface 14 is not formed in the product region 16, and it is possible to improve the appearance quality of the product region 16, and to prevent the reduction in the mechanical strength of the product region 16.

In FIG. 1C, the asperity surface 14 is formed in the bonding area 15 specified in the outer periphery underside of the product region 16 by moving the air bubbles by the same technique described above. The bonding area 15 is the area at which the fiber-reinforced composite material 10 completed as a product is bonded to another member (not illustrated) using adhesive. Application of adhesive to the asperity surface 14 brings an anchoring effect which causes the adhesive to move deep into the asperity surface 14, and thus it is possible to increase the adhesion strength between the adhesive and the fiber-reinforced composite material 10, and to improve the bonding strength between the fiber-reinforced composite material 10 and another member. Since the bonding area 15 is the area that is to be bonded to another member, and invisible from the outside, formation of the asperity surface 14 in the bonding area 15 makes the asperity surface 14 invisible from the outside, and enables improvement of the appearance quality of a product, such as a vehicle in which the fiber-reinforced composite material 10 is incorporated.

In general, when the fiber-reinforced composite material 10 is bonded using adhesive, in order to improve the adhesive strength, roughening treatment is performed on the area to be bonded by performing chemical treatment. In this example, since the asperity surface 14, which improves adhesiveness, is formed by controlling the sizes and positions of air bubbles in the molding step, the roughening treatment for improving the adhesiveness is unnecessary, and thus the manufacturing process can be simplified.

Figure 2:
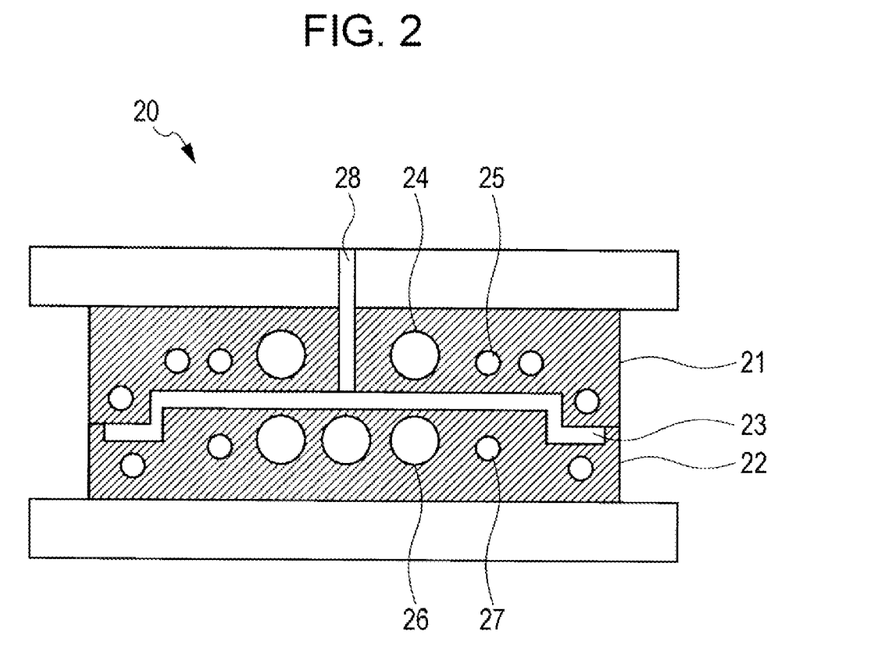
FIG. 2 is a sectional view of a mold used in the method of manufacturing a fiber-reinforced composite material according to the example of the present invention.

Referring to FIG. 2, a mold 20 used for the method of manufacturing the fiber-reinforced composite material 10 according to this example will be described. The mold 20 includes an upper mold 21 and a lower mold 22. When the upper mold 21 and the lower mold 22 are closed, a cavity 23 is formed as a gap between the molds. The cavity 23 has the same shape as the fiber-reinforced composite material 10 manufactured this example.

An inlet 28 that penetrates through the upper mold 21 is formed. A resin in a liquid state or a state of low viscosity is supplied to the mold 20 through the inlet 28 from the outside. Here, a single inlet 28 is formed at a central area of the upper mold 21. However, the inlet 28 may be formed in the peripheral area of the upper mold 21, or multiple inlets 28 may be formed. Alternatively, the inlet 28 may be formed in the lower mold 22.

In the mold 20 used in this example, pipe paths are formed as an air bubble position controller for moving air bubbles contained in the resin 12 injected into the cavity 23 to a predetermined position. Specifically, in the upper mold 21, pipe paths 24, 25, through which heated or cooled fluid flows, are formed so as to extend in the direction to penetrate the paper surface. The cross-sectional area of the pipe path 24 formed near the center of the upper mold 21 is larger than the cross-sectional area of the pipe path 25 formed in the peripheral area of the upper mold 21. Similarly, pipe paths 26, 27 are formed in the lower mold 22, and the cross-sectional area of the pipe path 26 formed at a central area of the lower mold 22 is larger than the cross-sectional area of the pipe path 27 formed in the peripheral area of the lower mold 22. In this example, a temperature gradient is formed in the mold 20 by flowing a heated or cooled fluid through the above-mentioned pipe paths 24, 25, 26, 27, and the timing of curing of the resin filled in the cavity 23 is controlled by the temperature gradient, and thereby the positions of the air bubbles 29 contained in the resin 12 inside the cavity 23 are precisely controlled. This matter will be described later.

It is to be noted that the cross-sectional areas of the pipe paths 24, 25, 26, 27 may be approximately equal. In such a case, the pipe path 24 and other pipe paths near the central area of the mold 20 may be disposed more densely than the pipe path 25 and other pipe paths near the peripheral area of the mold 20. In this manner, the above-mentioned temperature gradient can be formed by heating or cooling the vicinity of the central area of the mold 20 more than the vicinity of the peripheral area.

Furthermore, the pipe path 24 and others may be densely disposed near the central area of the mold 20, and the cross-sectional areas of the pipe path 24 and others near the central area may be set to be larger than the cross-sectional areas of the pipe path 25 and others in the peripheral area of the mold 20. Even with this configuration, the above-mentioned temperature gradient can be formed.

Various controllers may be adopted as the air bubble position controller that controls the positions of the air bubbles contained in the resin 12. Specifically, the following may be adopted as the air bubble position controller: the above-mentioned heater that forms a temperature gradient by heating the mold 20, and controls the positions of the air bubbles 29, a cooler that forms a temperature gradient by cooling the mold 20, and controls the positions of the air bubbles 29, an ultrasonic generator that moves the air bubbles 29 by ultrasonic waves, a static electricity generator that moves the air bubbles 29 by static electricity, and a magnetic force generator that moves the air bubbles 29 by a magnetic force.

The following may be adopted as the air bubble subdivider that subdivides the air bubbles contained in resin 12 to fine air bubbles: an ultrasonic wave applicator that subdivides the air bubbles by applying ultrasonic waves to the resin 12 inside the mold 20, and a vibration applicator that subdivides the air bubbles by applying vibration to the resin 12. As described later, the shape of the asperity surface 14 (see FIG. 1B) to be formed can be optimized by subdividing the air bubbles to fine air bubbles, and it is possible to promote the movement of the air bubbles inside the resin 12.

Figure 3A:
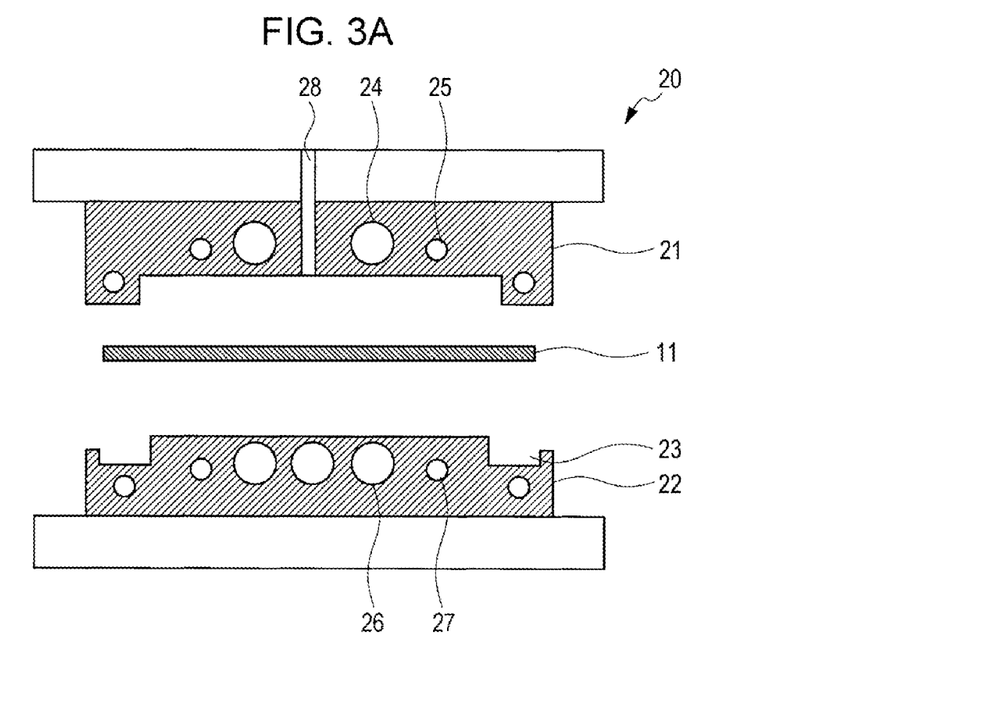
FIGS. 3A and 3B are each a sectional view.
Figure 3B:
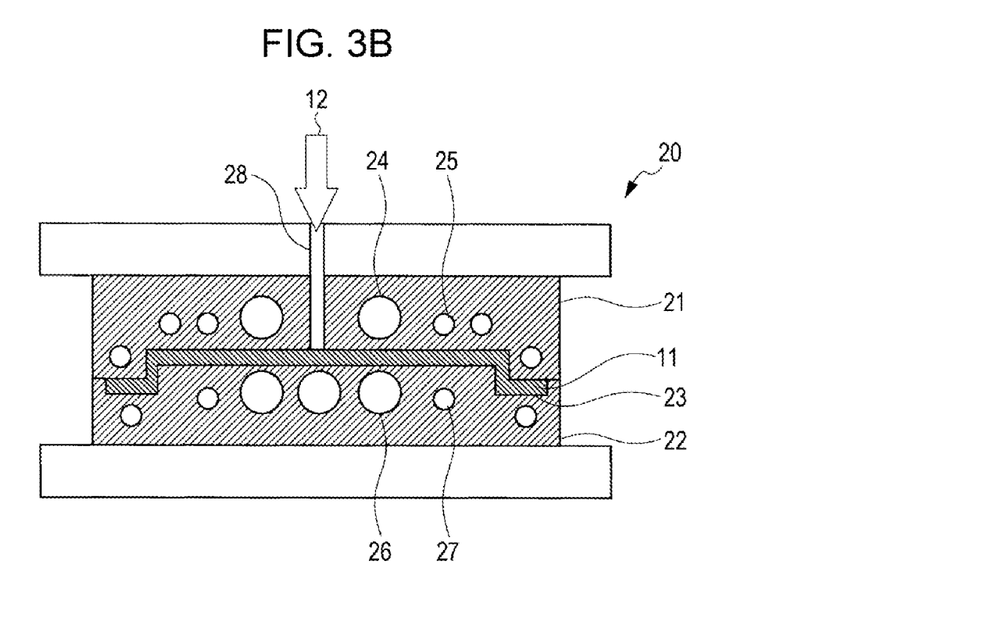

Referring to FIGS. 3A and 3B, the molding step for manufacturing the fiber-reinforced composite material 10 using the mold 20 in the above-mentioned configuration will be described. The molding step may be referred to as shaping step. Here, a case is illustrated in which the positions of the air bubbles 29 are controlled by forming a temperature gradient by heating the mold 20.

Referring to FIG. 3A, first, the fiber-reinforced sheet 11 is placed between the upper mold 21 and the lower mold 22. Here, the fiber-reinforced sheet 11 is placed at a predetermined position of the mold 20 in a multilayer structure composed of a fibrous material, and not a preform structure which has undergone preliminary shaping.

Referring to FIG. 3B, subsequently, the fiber-reinforced sheet 11 is placed in the cavity 23 which is formed as a gap between the upper mold 21 and the lower mold 22 by bringing the upper mold 21 and the lower mold 22 into contact with each other. Subsequently, the resin 12 is injected into the cavity 23 through the inlet 28 in this state, and thereby the fiber-reinforced sheet 11 is impregnated with the resin 12 inside the cavity 23. The resin 12 injected into the cavity 23 through the inlet 28 contains the air bubbles 29 which are not illustrated here, thus the air bubbles 29 are also mixed in the resin 12 inside the cavity 23.

In this example, ultrasonic waves or vibration is applied to the resin 12 before injected into the cavity 23, and the resin 12 after injected into the cavity 23. In this manner, the diameters of the air bubbles 29 contained in the resin 12 can be reduced to, for instance, approximately 1.0 mm or less (preferably, for example, 0.1 mm or less), and thus movement of the air bubbles 29 can be facilitated. In addition, the subdivision of the air bubbles 29 to fine air bubbles reduces the depth of the asperity surface 14 (FIG. 1B) which is formed as air bubble trails, and the formation of the asperity surface 14 can prevent the reduction in the strength of the fiber-reinforced composite material 10.

Figure 4A:
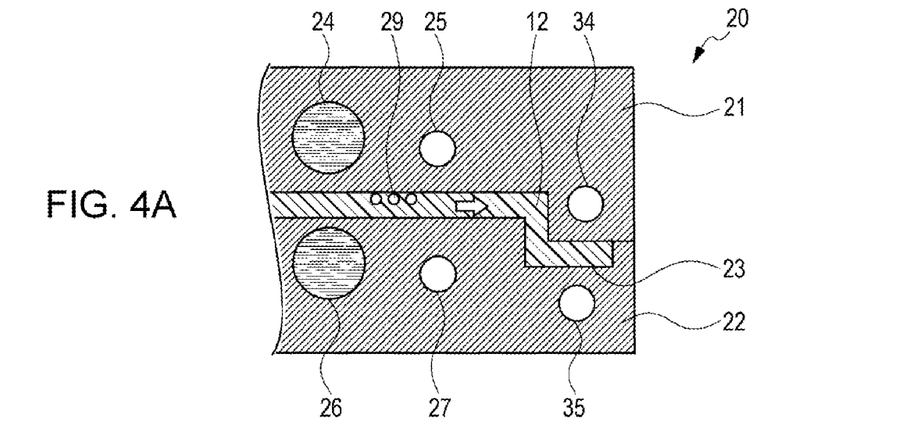
FIGS. 4A to 4C are each an enlarged sectional view.
Figure 4B:
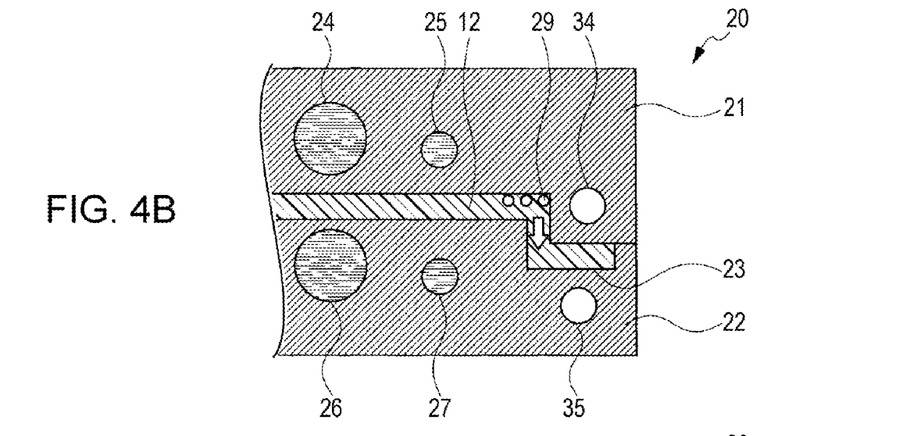
Figure 4C:
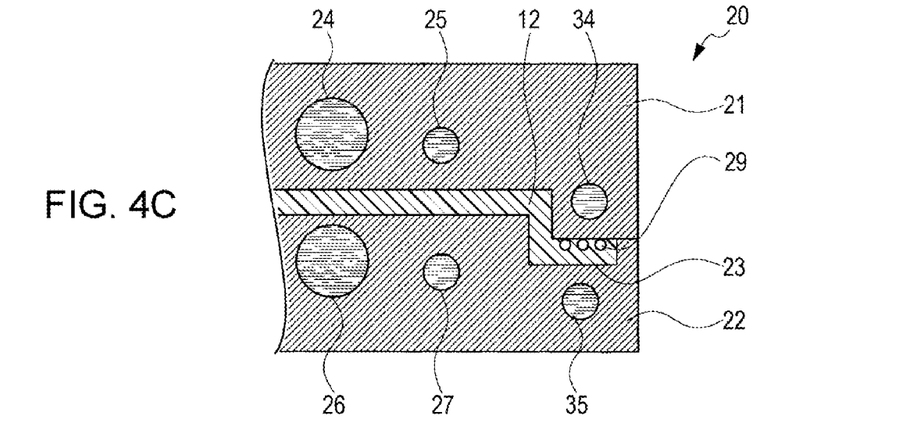

Referring to FIGS. 4A to 4C, the step of moving the air bubbles 29 to a predetermined position inside the cavity 23 is described. FIGS. 4A to 4C are enlarged sectional views illustrating this step successively. It is to be noted that in FIGS. 4A to 4C, in order to clearly illustrate the air bubbles 29, the fiber-reinforced sheet 11 placed in the cavity 23 is not illustrated. Also, in each of FIGS. 4A to 4C, the direction of movement of the air bubbles 29 is indicated by an arrow. Here, a case is described in which the air bubbles 29 are moved from a central area to a peripheral area in the cavity 23.

In this example the air bubbles 29 are moved from a central area to a peripheral area inside the cavity 23 by forming a temperature gradient in the mold 20 by heating.

Specifically, when the resin injected into the cavity 23 is a thermosetting resin which is cured by heating, after the injection of the resin 12 is completed, the mold 20 is gradually heated from a central area to a peripheral area. The heating can be performed by passing a high temperature fluid through the pipe path 24 and others formed in the mold 20. For instance, heated steam, water, or oil may be used as the fluid passed through the pipe path 24 and others. Here, the temperature of the heated fluid to be passed through the pipe path 24 and others is higher than or equal to a temperature at which curing reaction occurs in the resin 12 which is a thermosetting resin present in the cavity 23. As an example, when the resin 12 is an epoxy resin, the temperature of the heated fluid that is passed through the pipe path 24 and others is higher than or equal to 150° C. at which the epoxy resin is cured.

As illustrated in FIG. 4A, first, a high-temperature fluid is passed through the pipe path 24 disposed near the central area of the upper mold 21 and the pipe path 26 disposed near the central area of the lower mold 22. Here, the pipe path, through which the fluid is passed, is hatched.

In this manner, the vicinity of the center of the mold 20 is heated by a high-temperature fluid which is passed through the pipe paths 24, 26, and the resin 12 injected into the vicinity of the center of the cavity 23, is cured. Accordingly, the air bubbles 29 mixed in the resin 12 in the vicinity of the center of the cavity 23 are moved from the vicinity of the center to the outer peripheral area.

Referring to FIG. 4B, when heat curing of the resin 12 advances in the vicinity of the center of the cavity 23, next, in the upper mold 21, the heated fluid is passed through the pipe path 25 formed in the outer peripheral area rather than through the pipe path 24. At the same time, in the lower mold 22, the heated fluid is passed through the pipe path 27 formed in the outer peripheral area rather than through the pipe path 26. In this manner, heat curing of the resin 12 advances toward a peripheral area by heating the resin 12 in the vicinity of the pipe path 26 and the pipe path 27. As heat curing of the resin 12 advances toward a peripheral area, the air bubbles 29 mixed in the resin 12 are further moved toward a peripheral area. Here, the air bubbles 29 are sufficiently subdivided and diffused by ultrasonic waves, and a buoyancy force acting on individual air bubbles 29 is small, and thus the air bubbles 29, when moving toward a peripheral area, can move downward. That is, even when the sectional shape of the cavity 23 is a curve shape that is curved downward toward the periphery area, the air bubbles 29 can be moved following the curve shape.

Referring to FIG. 4C, next, a heated fluid is passed through the pipe path 34 formed in the outermost peripheral area in the upper mold 21. At the same time, a heated fluid is passed through the pipe path 35 formed in the outermost peripheral area in the lower mold 22. In this manner, heat curing of the resin 12 advances toward a further peripheral area by heating the resin 12 in the vicinity of the pipe path 34 and the pipe path 35. As heat curing of the resin 12 advances toward a peripheral area, the air bubbles 29 mixed in the resin 12 gather at a peripheral area. When heat curing has advanced toward a peripheral area and is sufficiently done, the asperity surface 14 illustrated in FIG. 1B is formed at the location where the air bubbles 29 gather at a peripheral area of the cavity 23.

After the heat curing step is completed, the upper mold 21 is removed from the lower mold 22, the cured fiber-reinforced sheet 11, which is impregnated into the resin 12, is taken out from the mold 20. Subsequently, the fiber-reinforced composite material 10 is obtained as a product by cutting along the area indicated by a dashed dotted line in FIG. 1A.

In this example, the air bubbles 29 are subdivided by applying ultrasonic waves to the resin 12 by the ultrasonic waves applicator. In this manner, the diameters of the air bubbles 29 contained can be reduced to, for instance, approximately 1.0 mm or less (preferably, for example, 0.1 mm or less), and thus the air bubbles 29 can be favorably moved inside the resin 12. Particularly, in this example, since the resin 12 is impregnated into the fiber-reinforced sheet 11, it is not easy to move the air bubbles 29 to a predetermined position inside the resin 12, but even under such a situation, it is possible to move the air bubbles 29 to a predetermined position by subdividing the air bubbles 29 to fine air bubbles.

With the above-described method, by passing a heated fluid through the pipe path 24 and others, the resin 12 which is a thermosetting resin can be cured and at the same time the air bubbles 29 can be moved inside the cavity 23 in a predetermined direction. Thus, the air bubbles 29 can be moved to a predetermined position without increasing the number of steps.

In the above description, after a high-temperature fluid is passed through the pipe path 24 and others at a central area of the mold 20, a high-temperature fluid is passed through the pipe path 34 at a peripheral area. However, a high-temperature fluid may be passed through these pipe paths at the same time. Since a great amount of high-temperature fluid is passed through the pipe path 24 and others at a central area having a relatively larger sectional area, the vicinity of the center of the mold 20 starts to be heated to a high temperature, and the same effect as mentioned above can be obtained. Also, the time taken for heat curing of the resin 12 can be reduced by heating the mold 20 overall.

In addition, although a high-temperature fluid is passed through the pipe path 24 and others to cure a thermosetting resin in the above description, when a thermoplastic resin is adopted as the resin 12, instead of a high-temperature fluid, a low-temperature fluid is passed through the pipe path 24 and others.

Specifically, referring to FIG. 4A, first, a low-temperature fluid is passed through the pipe paths 24, 26 disposed at a central area of the mold 20, and thereby curing of the resin 12 which is a thermoplastic resin advances at a central area of the cavity 23. Furthermore, as illustrated in FIG. 4B, a low-temperature fluid is passed through the pipe paths 25, 27 disposed closer to a peripheral area than the pipe paths 24, 26, and curing of the resin 12 advances toward a peripheral area. Finally, a low-temperature fluid is passed through the pipe paths 34, 35 disposed at a peripheral area of the mold 20, curing of the resin 12 advances to a peripheral area. Here, the temperature of the low-temperature fluid that is passed through the pipe path 24 and others is lower than or equal to a temperature at which the thermoplastic resin (for instance, polypropylene) filled in the cavity 23 can be cured, for instance, 20° C. to 60° C. or less (preferably, for instance, 40° C. or less). Here, water, or oil may be used as the low-temperature fluid that is passed through each pipe path.

Here, in addition to the above-described methods, various methods may be adopted as the method of moving the air bubbles 29 contained in the resin 12 toward a predetermined position.

For instance, static electricity may be generated inside the cavity 23 of the mold 20 using a static electricity generator so that the air bubbles 29 are moved from a central area to a peripheral area. In addition, ultrasonic waves may be generated inside the cavity 23 of the mold 20 by optimizing the frequency and output of the ultrasonic waves using an ultrasonic generator so that the air bubbles 29 are moved from a central area to a peripheral area. Furthermore, magnetism may be generated inside the cavity 23 of the mold 20 using a magnetism generator so that the air bubbles 29 are moved from a central area to a peripheral area.

Figure 5A:
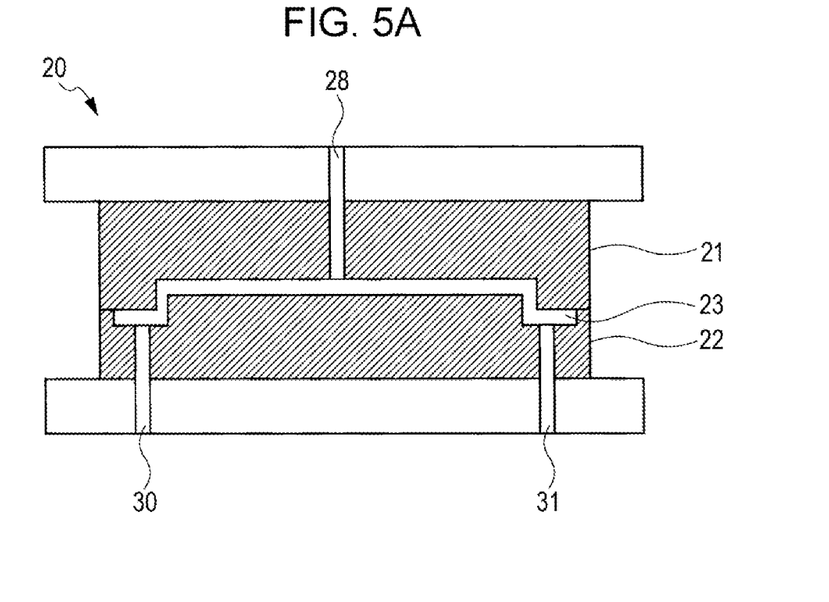
FIG. 5A is a sectional view of the mold.
Figure 5B:
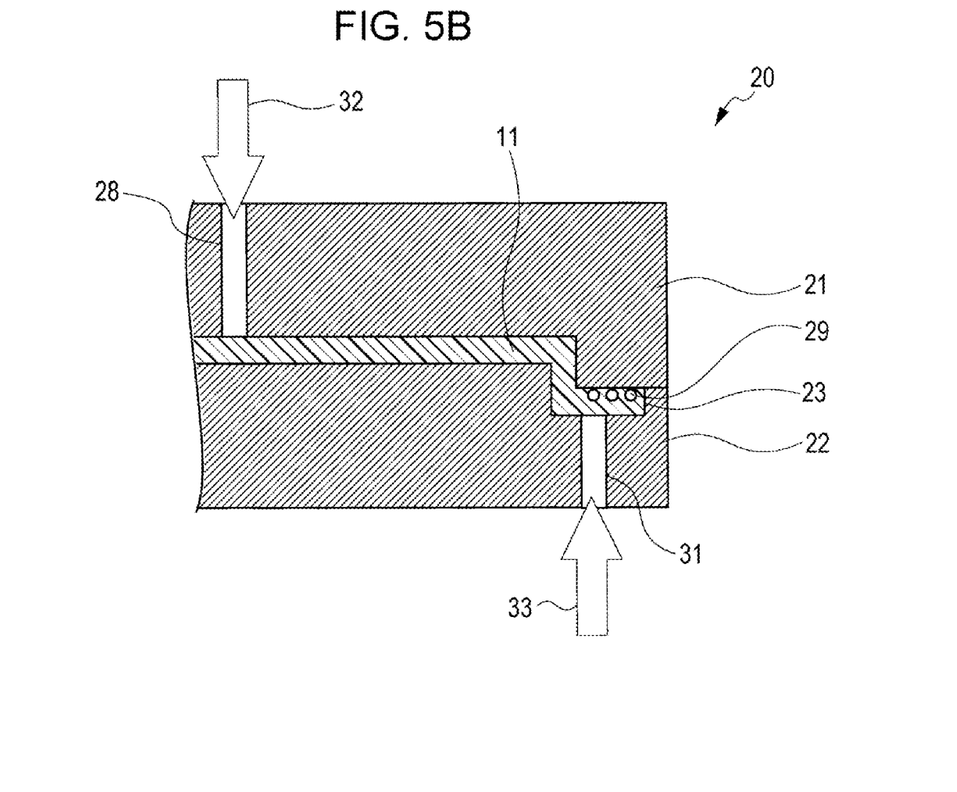
FIG. 5B is an enlarged sectional view illustrating the manner in which the fiber-reinforced composite material is molded using the mold.

Referring to FIGS. 5A and 5B, a molding method according to another example will be described. FIG. 5A is a sectional view illustrating a molding method according to another example, and FIG. 5B is an enlarged sectional view of the molding method. Here, the air bubbles 29 are placed at a predetermined position by injecting a resin containing the air bubbles 29 to the predetermined position of the cavity 23.

Referring to FIG. 5A, similarly to what has been described, the mold 20 used here includes the upper mold 21 and the lower mold 22. In the mold 20, multiple inlets 28 for injecting the resin into the cavity 23 are formed. Specifically, the inlets 28 are formed at a central area of the upper mold 21, and two inlets 30, 31 are formed at a peripheral area of the lower mold 22. The inlets 30, 31 are first inlets through which a resin (a first resin) containing air bubbles is injected, and the inlets 28 are second inlets through which a resin (a second resin) which does not substantially contain air bubbles. The inlets 30, 31 are disposed in a region where the asperity surface 14 illustrated in FIG. 1B is formed.

Referring to FIG. 5B, a resin 32 is injected into the cavity 23 through the inlet 28 which is formed in the upper mold 21. The resin 32 has undergone defoaming processing before being injected, and hardly contain air bubbles. The resin 32 not containing air bubbles is injected into the inside of the cavity 23 through the inlet 28 which is formed in a central area of the mold 20, and thereby it is possible to prevent formation of air bubble trails on the surface of fiber-reinforced composite material 10 to be manufactured without leaving the air bubbles 29 at a central region of the cavity 23.

On the other hand, a resin 33 containing the air bubbles 29 subdivided to fine air bubbles by ultrasonic waves is injected into the inside of the cavity 23 through the inlet 31 which is disposed at a peripheral area of the lower mold 22. Here, the amount of air bubbles contained in the resin 33 per unit amount is greater than the amount of air bubbles contained in the resin 33 per unit amount.

The resin 33 injected through the inlet 31 is filled in the peripheral area of the cavity 23. Accordingly, the air bubbles 29 contained in the resin 33 are also disposed at the upper end of the peripheral area of the cavity 23. It is to be noted that the resin 33 containing air bubbles is also injected into the cavity 23 through the inlet 30 illustrated in FIG. 5A. Here, the resin injected through the inlets 28, 30, 31 is integrated inside the cavity 23.

After the injection step is completed, the resins 32, 33 impregnated into the fiber-reinforced sheet 11 (not illustrated) inside the cavity 23 are cured by heat-treatment, and the upper mold 21 and the lower mold 22 are separated, then the fiber-reinforced composite material 10 illustrated in FIGS. 1A to 1C is taken out.

As described above, the injection step is performed by injecting the resin 33 containing air bubbles into an area in which the asperity surface 14 illustrated in FIG. 1B is formed, and thereby it is possible to place the air bubbles 29 at a predetermined position inside the cavity 23 and the asperity surface 14 as illustrated in FIG. 1B can be formed at a predetermined position. Thus, it is not necessary to move the air bubbles 29 inside the cavity 23 after injection of the resin, and the molding step can be simplified.

Although the example of the present invention has been described above, the present invention is not limited to the above-described example.

A first aspect of the present invention provides a method of manufacturing a fiber-reinforced composite material which is molded by impregnating a fiber-reinforced sheet with a resin and curing the resin, the method including: placing the fiber-reinforced sheet in a cavity of a mold; and molding the fiber-reinforced composite material, the molding including injecting the resin into the cavity of the mold, impregnating the fiber-reinforced sheet with the resin, and curing the resin. In the molding, after fine air bubbles contained in the resin are placed at a predetermined position of the cavity, the resin is cured. Thus, the air bubbles subdivided to fine air bubbles in a stage before the resin is cured are placed at a predetermined position of the cavity of the mold, and fine asperity surface due to the presence of the air bubbles can be formed at a predetermined position on the surface of the fiber-reinforced composite material to be manufactured. Consequently, when the fiber-reinforced composite material manufactured is bonded to another member using adhesive, the bonding strength between the asperity surface and the adhesive can be increased due to the anchoring effect by applying the adhesive to the asperity surface of the fiber-reinforced composite material.

In the method of manufacturing a fiber-reinforced composite material, the air bubbles contained in the resin may be moved to the predetermined position by forming a temperature gradient in the mold. Thus, the timing of curing of the resin injected into the inside the mold can be adjusted, and the air bubbles contained in the resin can be moved to a predetermined position by providing a temperature gradient in the mold.

In the method of manufacturing a fiber-reinforced composite material, in the molding, before the resin injected into the cavity is cured, the air bubbles contained in the resin may be moved to the predetermined position by generating magnetic force, sound waves, or static electricity in the mold. Thus, the air bubbles contained in a pre-cured resin in a liquid state or a state of low viscosity can be moved to a predetermined position by applying a magnetic force, sound waves, or static electricity to the mold.

In the method of manufacturing a fiber-reinforced composite material, in the molding, a first resin containing the air bubbles may be injected into the cavity through a first inlet provided in the mold, and the air bubbles contained in the first resin may be placed at the predetermined position by injecting a second resin into the cavity through a second inlet provided in the mold, the second resin including an amount of content of the air bubbles less than an amount of content of the air bubbles of the first resin. Thus, air bubbles can be placed at a predetermined position by injecting the first resin containing air bubbles through the first inlet without performing a step of moving the air bubbles to a predetermined position inside the cavity.

In the method of manufacturing a fiber-reinforced composite material, the air bubbles contained in the resin may be subdivided to fine air bubbles by applying ultrasonic waves or vibration to the resin before being cured. Thus, the asperity which is air bubble trails formed on the surface of the fiber-reinforced composite material can be reduced by subdividing the air bubbles to fine air bubbles, and it is possible to prevent the reduction in the mechanical strength of the fiber-reinforced composite material. Also, movement of the air bubbles inside the resin can be promoted by subdividing the air bubbles to fine air bubbles.

The invention claimed is:

1. A method of manufacturing a fiber-reinforced composite material which is molded by impregnating a fiber-reinforced sheet with a resin and curing the resin, the method comprising:
    placing the fiber-reinforced sheet in a cavity of a mold; and
    molding the fiber-reinforced composite material, the molding comprising injecting the resin into the cavity of the mold, impregnating the fiber-reinforced sheet with the resin, and curing the resin,
    wherein in the molding, after fine air bubbles contained in the resin are placed at a predetermined position of the cavity, the resin is cured, wherein in the molding, a first resin containing the air bubbles is injected into the cavity through a first inlet provided in the mold, and the air bubbles contained in the first resin are placed at the predetermined position by injecting a second resin into the cavity through a second inlet provided in the mold, the second resin including an amount of content of the air bubbles less than an amount of content of the air bubbles of the first resin.

2. The method of manufacturing a fiber-reinforced composite material according to claim 1,
wherein the air bubbles contained in the resin are subdivided to fine air bubbles by applying ultrasonic waves or vibration to the resin before being cured.

* * * * *